May 26, 1964  H. S. EGERTON ETAL  3,134,444
AIRCRAFT ROTOR-PROPELLER

Filed Aug. 23, 1961  4 Sheets-Sheet 1

INVENTORS
HARRY S. EGERTON
CHARLES W. ELLIS, III
DONALD W. ROBINSON, JR.

BY *Teller, McCormick, Paulding & Huber*

ATTORNEYS

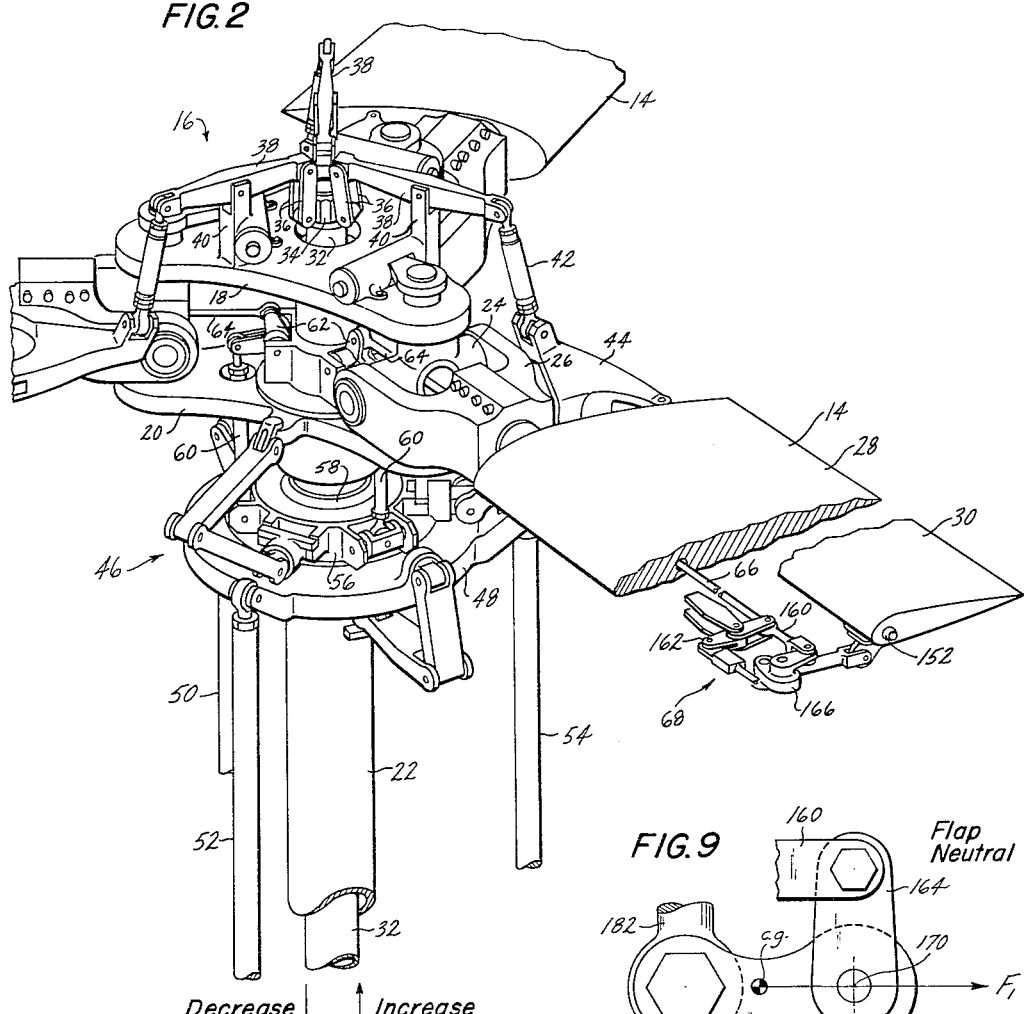
FIG. 2
Decrease ↓ ↑ Increase
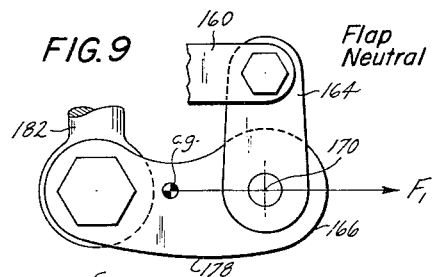
FIG. 9 — Flap Neutral
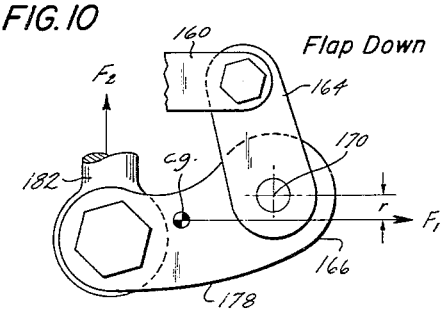
FIG. 10 — Flap Down
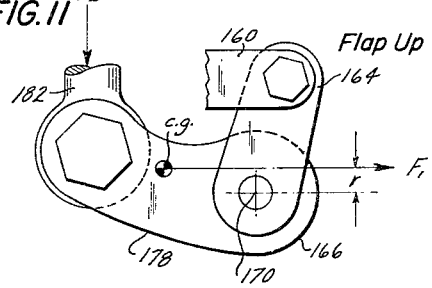
FIG. 11 — Flap Up

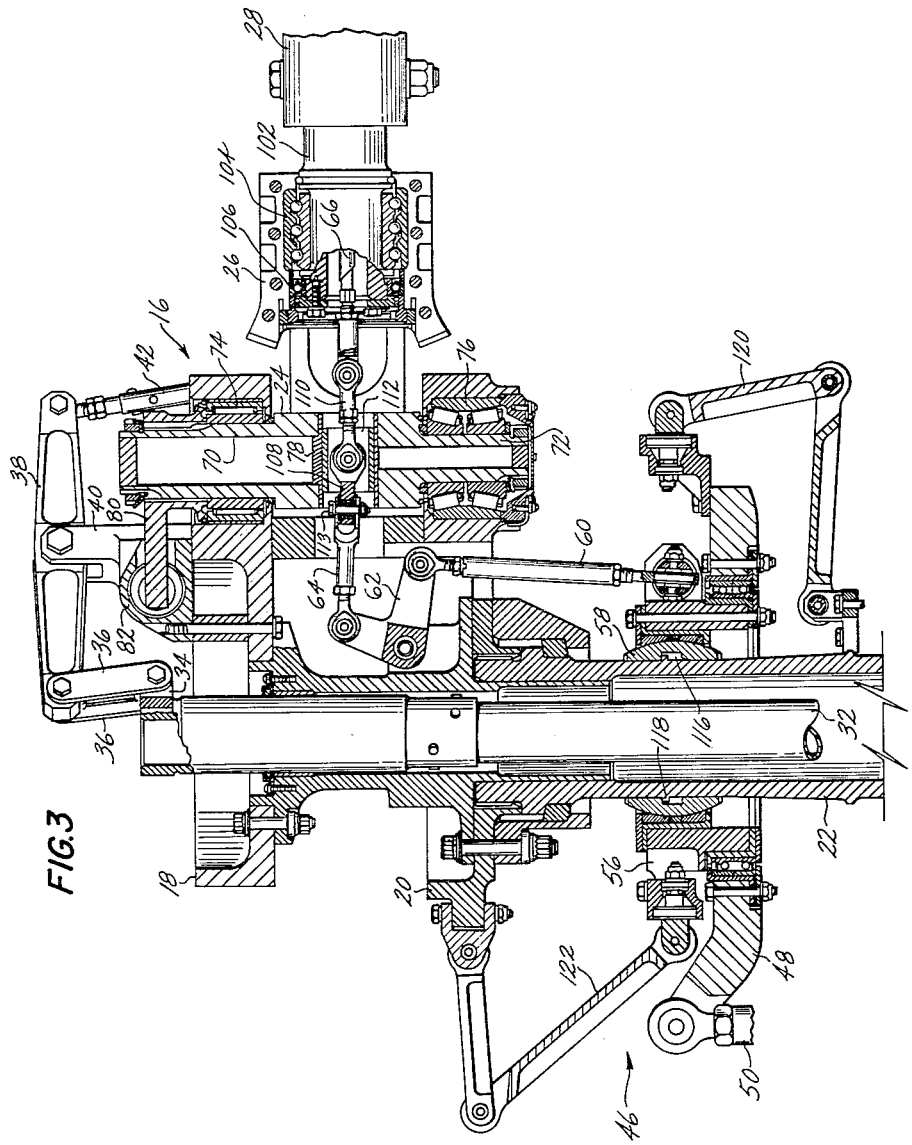

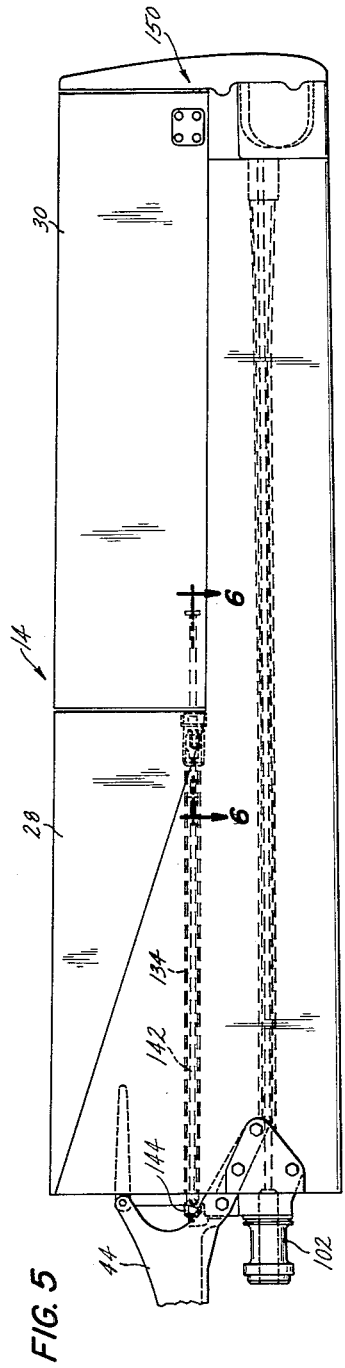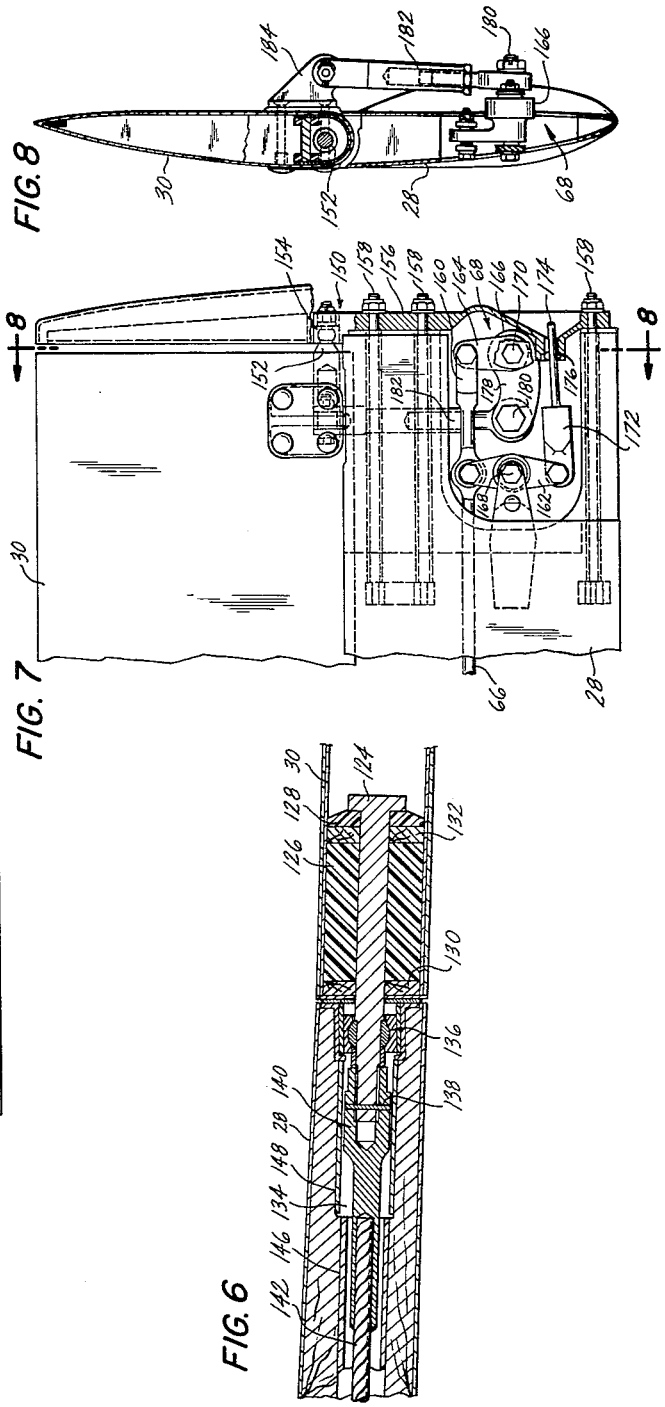

United States Patent Office 3,134,444
Patented May 26, 1964

3,134,444
AIRCRAFT ROTOR-PROPELLER
Harry S. Egerton, Granville, Mass., and Charles W. Ellis III, Bloomfield, and Donald W. Robinson, Jr., Hazardville, Conn., assignors to Kaman Aircraft Corporation, a corporation of Connecticut
Filed Aug. 23, 1961, Ser. No. 133,360
28 Claims. (Cl. 170—160.1)

This invention relates to a rotary thrust producing device for an aircraft which device may be used to provide either vertical lifting thrust similar to that produced by a helicopter rotor or forward propulsive thrust similar to that produced by an airplane propeller, and deals more particularly to an improved rotor-propeller adapted for use in a converti-plane, such as that shown in the copending application of Ellis, Robinson and Egerton, Serial Number 113,050, entitled VTOL/STOL Aircraft, wherein the rotor-propeller is tiltable between substantially horizontal and substantially vertical positions.

The general object of this invention is to provide a bladed rotor-propeller which operates at optimum efficiency over a wide range of airspeeds and wherein the pitches of the blades are cyclically variable to impart steering moments to the aircraft. More particularly, and in keeping with this general object, the invention concerns the provision of a rotor-propeller having blades with parts which are adjustable to vary the blade camber and to provide varying amounts of collective and cyclic blade pitch.

Another object of this invention is to provide a rotor-propeller of the above character wherein the blades are universally connected with a hub to permit flapping and lead-lag blade motion and which rotor-propeller includes mechanism for transmitting mechanical movements originating from pilot operable devices or the like in the fuselage from the hub to the blades to effect the desired adjustment of the blade parts.

Another object of this invention is to provide a rotor-propeller of the above character which eliminates the possibility of ground resonance or mechanical instability due to coupling between the lead-lag motion of the blades and other motions of the helicopter and which eliminates the high bending stresses present in a blade rigidly fixed to a hub.

A further object of this invention is to provide a rotor-propeller of the foregoing character wherein the control forces required to move the blade parts and to hold the same in their various adjusted positions are reduced to a minimum.

Other objects and advantages of this invention will be apparent from the following description and from the accompanying drawings forming a part thereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 2 is a fragmentary perspective view of the rotor-propeller of FIG. 1 and which view is somewhat schematic in that various minor parts have been omitted and other parts shown in a conventionalized fashion in order to clarify the basic construction, part of one blade being shown broken away to reveal the construction of the counterbalancing mechanism in the blade tip.

FIG. 3 is a longitudinal sectional view taken on the line 3—3 of FIG. 1.

FIG. 5 is a plan view of one of the blades employed in the rotor-propeller of FIG. 1.

FIG. 6 is an enlarged and fragmentary longitudinal sectional view taken on the line 6—6 of FIG. 5 and showing the inboard hinge connection between the blade flap and the blade body.

FIG. 7 is an enlarged and fragmentary plan view of the tip portion of the blade shown in FIG. 5 with various parts being omitted or shown broken away to reveal the structure of the counterbalancing mechanism.

FIG. 8 is a transverse sectional view taken on the line 8—8 of FIG. 7 and in which some parts have been omitted for clarity.

FIGS. 9, 10 and 11 show a part of of the counterbalancing mechanism for different positions of the associated flap and illustrate the manner in which the mechanism acts to counteract the aerodynamic load on the flap.

*General Organization*

Figures 1, 4:
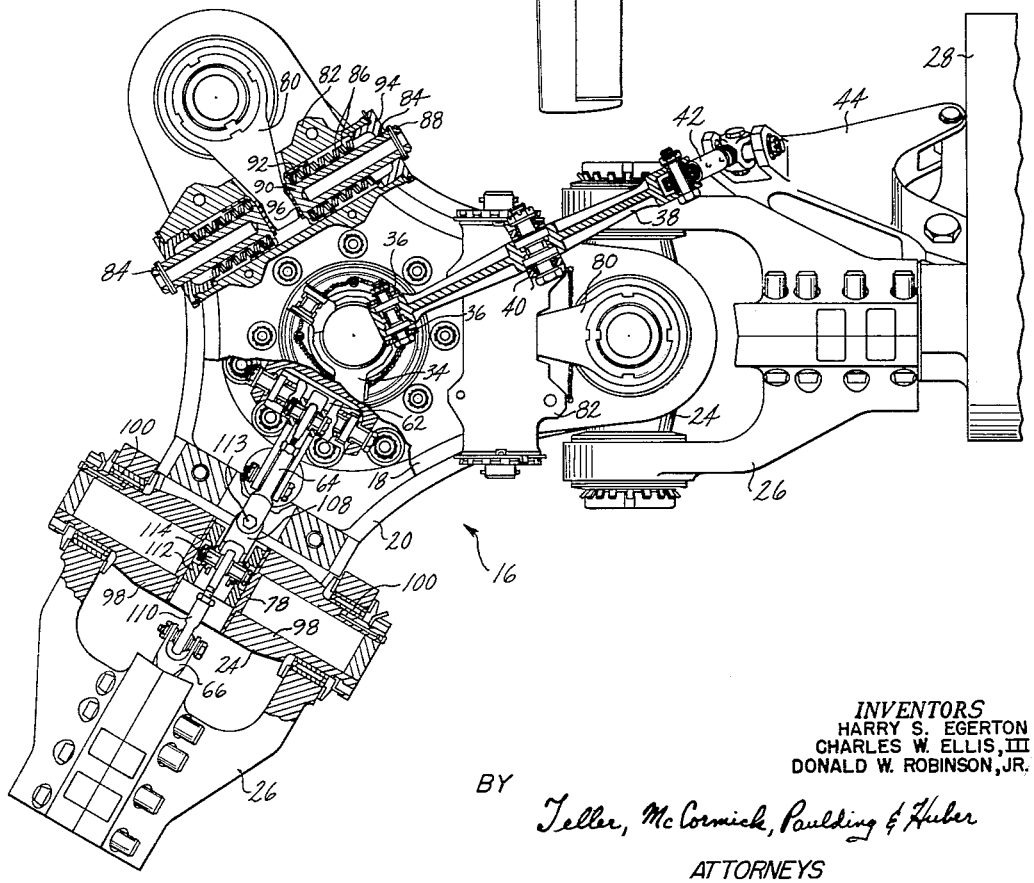
FIG. 1 is an elevational view looking toward the front of a complete rotor-propeller embodying the present invention.
FIG. 4 is an enlarged front end view of the hub of the rotor-propeller of FIG. 1 with various parts being broken away at different levels to reveal the structure of other parts.

FIG. 1 of the drawings shows an aircraft rotor-propeller embodying the present invention, the view being taken looking toward the front of the rotor-propeller. FIG. 2 is a somewhat conventionalized perspective view of a portion of the rotor-propeller of FIG. 1.

As shown by these figures, the rotor-propeller has three blades 14, 14 attached at their inboard or root ends to a hub assembly indicated generally at 16. The number of blades, however, is not important to the invention and various other numbers of blades may be employed without departing therefrom.

The hub assembly 16 as illustrated in FIG. 2 is of a watch-case construction and includes two hub members 18 and 20 fixed in axially spaced relation to a hollow longitudinal drive shaft 22. In use the drive shaft 22 is supported by suitable bearings, not shown, for rotation about its central axis and is adapted for driving connection with one of the engines of the aircraft. Each of the hub members 18 and 20 has three arms which are equally angularly spaced, and the arms of each hub member are angularly aligned with a corresponding arm of the other hub so as to provide three pairs of axially spaced arms. Each of the three pairs of arms is in turn connected with a respective one of the three blades 14, 14.

Preferably, the connections between the blades and the hub assembly are such that the blades are free to pivot or oscillate about lead-lag axes extending generally parallel to the shaft 22 and also to pivot or oscillate about flapping axes disposed in a plane generally normal to the axis of the latter shaft. Movement of the blades in the lead-lag direction occurs substantially in the plane or path of the blade rotation and is sometimes referred to as in-plane motion. To permit this lead-lag and flapping motion of the blades, each blade is connected to the hub assembly 16 by a universal joint. The universal joint may be of various different designs but preferably and as illustrated includes a cross-shaped pivot member 24 having two colinear arms pivotally supported by the hub members 18 and 20 respectively and two other colinear arms which pivotally support a blade grip 26 attached to the inboard end or root of the associated blade.

An important feature of the illustrated rotor-propeller is that the blades are adjustable to provide independent changes in collective pitch, cyclic pitch and blade camber. This is achieved by constructing each blade of two aerodynamic reaction parts. The first reaction part is supported relative to the hub assembly for movement about a longitudinal or span-wise axis extending generally radially of the hub to permit changes in its angle of incidence with respect to its plane of rotation. The second aerodynamic reaction part is carried by the first part and is adjustable relative thereto about a longitudinal axis to change its angle of incidence with respect to the first part. The two parts are so constructed and arranged that they form a composite blade shape with the movement of the second part relative to the first serving to vary the camber of said blade shape. By adjusting the first parts in unison and to the same extents about their longitudinal axes the incidence of the blades may be changed in a collective manner. By adjusting the second parts in unison and to the same extents about their longitudinal axes the camber of the blades may be changed in a collective manner. Adjusting the second parts about their longitudinal axes in a cyclical manner as the hub assembly is rotated effects a cyclic lift or thrust variation on each blade to change the direction of the line of thrust produced by the rotor-propeller.

Various different arrangements of first and second reaction parts may be used to achieve the results set forth above. In the preferred and illustrated case, however, the first reaction part of each blade comprises a blade body 28 and the second reaction part comprises a flap 30. Each flap 30 extends longitudinally for substantially more than half the length of the blade 14 and is connected with the associated blade body 28 along the outboard trailing edge portion of the latter. The blade body defines a notch for receiving the associated flap and along the length of the flap the flap and blade body together form a substantially uninterrupted aerofoil cross section.

The blade bodies 28, 28 are attached to the associated blade grips 26, 26 for movement about longitudinal or generally radial pitch changing axes while the flaps 30, 30 are attached to the associated blade bodies for movement about other longitudinal or generally radial deflection changing axes located adjacent the leading edges of the flaps. The construction of the means for connecting the blade bodies to the hub and the flaps to the blade bodies are described in more detail hereinafter.

Movement of the blade bodies 28, 28 about their longitudinal pitch changing axes is effected by a collective control rod 32 slidably mounted within the hollow drive shaft 22. The control rod 32 extends through and beyond the outer hub member 18 and at its outboard end is provided with a small three armed spider 34. Each arm of the spider is in turn pivotally connected by links 36, 36 to one end of a respective rocker 38 supported intermediate its ends by an upstanding bifurcated arm 40 on the outer hub member 18. The other end of each rocker 38 is connected by a rod 42 to an arm 44 attached to the inboard end of the associated blade body 28.

The collective control rod 32 is adapted to be moved longitudinally relative to the drive shaft 22 by suitable pilot operable control mechanism or the like within the fuselage of the associated aircraft. From FIG. 2 it will be apparent that sliding the control rod 32 in one direction or the other relative to the drive shaft 22 will simultaneously and to the same extents change the pitches of the three blades 14, 14 by rotating the blade bodies 28, 28 about their longitudinal pitch changing axes, the movement of the control rod 32 being transmitted simultaneously to the three blades through the three rockers 38, 38, the rods 42, 42 and the arms 44, 44. Movement of the control rod 32 thus changes the pitches of the rotor blades in a collective manner and controls the basic thrust or lift provided by the rotor-propeller. As indicated by the arrows in FIG. 2, movement of the control rod upwardly will increase the pitches of the blades while movement downwarddly will decrease the pitches of the blades.

Adjustment of the blade flaps 30, 30 to provide for changes in the camber of the blades or for cyclic variations in the lift or thrust produced by the blades is controlled by an azimuth mechanism 46 mounted on the drive shaft 22 behind the inner hub member 20. This mechanism is of generally conventional construction and includes a rotatively fixed ring member 48 which may be tilted in any direction about its center or moved longitudinally along the shaft 22 by three azimuth control rods 50, 52 and 54. Associated with the ring member 48 is a swash plate 56 which is free to rotate with the shaft 22 but is restrained to partake of the tilting and/or longitudinal movement of the ring member imposed thereon by the control rods 50, 52 and 54. The swash plate 56 has a central opening provided with a spherical bearing surface which engages the spherical outer surface of a ball member 58 slidably carried by the shaft 22.

Any change in the inclination of the ring member 48 relative to the axis of the shaft 22 causes a corresponding change in the inclination of the swash plate 56, the swash plate partaking of a swiveling motion relative to the ball 58. Likewise, any change in the longitudinal position of the ring member 48 on the shaft 22 will result in a corresponding change in the longitudinal position of the swash plate 56 with such movement being effected by a sliding motion of the ball member 58 relative to the shaft. The two azimuth control rods 50 and 54 are located diametrically opposite from each other and work in opposition to tilt the ring member and swash plate about an axis perpendicular to the line passing between the point at which said two control rods are attached to the ring member. The rod 52 is located midway between the rods 50 and 54, or at 90° from each of said two rods, and functions by itself to tilt the ring member and swash plate about an axis passing through the points at which the rods 50 and 54 are connected to the ring member.

Three other rods 60, 60 are pivotally connected at their rear or lower ends, as viewed in FIG. 2, to the swash plate 56, and extend upwardly or forwardly from the swash plate through openings in the inner hub member 20, one of the rods 60, 60 being behind and hidden by the shaft 22 in FIG. 2. The forward ends of these rods are connected respectively to corresponding arms of three bell cranks 62, 62 pivotally mounted for rotation about transverse axes relative to the shaft 22. The other arms of the bell cranks are connected to three rods or links 64, 64 which extend radially outwardly toward the blades 14, 14. Other linkage hereinafter described is associated with each cross shaped pivot member 24 for transferring the movement of each rod 64 to a longitudinal push-pull flap control rod 66 passing through the associated blade body 28.

The outboard end of each flap control rod 66 operates a counterbalance mechanism 68, hereinafter described in more detail, which converts the longitudinal movements of the control rod into movements of the associated flap 30 about its longitudinal pivot axis. At the same time the counterbalance mechanism operates to exert a force on the control rod which counteracts the centrifugal loads thereon and to also produce a force which counteracts the aerodynamic force exerted by the flap 30 on the control linkage. The counterbalance mechanism 68 therefore enables the control rod 66 to be moved with a minimum control force, thus reducing the effort required to be exerted by the pilot on the controls in the case where a pilot operated control mechanism is associated with the azimuth rods 50, 52 and 54.

The general operation of the azimuth mechanism 46 may be understood by reference to FIG. 2. In this figure the swash plate 56 and ring member 48 are shown in their neutral positions at which both parts are disposed normal to the axis of the drive shaft 22. When this condition exists rotation of the shaft and swash plate relative to the ring 48 will cause no movement of the rods 60, 60 and consequently no movements of the flaps relative to the blade bodies. If now the ring member and swash plate are tilted or inclined relative to the axis of the drive shaft each point on the periphery of the swash plate will oscillate axially relative to the shaft 22 as the latter rotates due to a wobbling motion of the plate with respect to the shaft, with each point on the swash plate moving between two extreme axial positions during each revolution of the shaft. Accordingly, each of the three rods 60, 60 connected with the swash plate 56 will be oscillated longitudinally as the shaft 22 rotates, and for each revolution of the shaft will be moved through one cycle of oscillation between two extreme axial positions with each rod attaining said extreme positions as they pass diametrically opposite points on the ring 48. As a result, the opsitions of the flaps 30, 30 relative to the blade bodies 28, 28 are changed as the rotor rotates. This adjustment of the flaps is of a cyclic nature with the flaps repeatedly reaching positions of maximum deflection when at one angular position relative to the ring member 48 and repeatedly reaching positions of minimum deflection when at the diametrically opposite position. The amplitude of the cyclic flap movement can be varied by changing the degree of inclination of the azimuth ring member 48 relative to the axis of the shaft 22.

The effect of the cyclic adjustment of each flap is to cause a cyclic variation in the lift of the blade of which it forms a part. The cyclic adjustment of the flap causes the blade to have maximum lift at one point in its path, a minimum lift at a diametrically opposite point, and intermediate degrees of lift at other points. The effect is substantially the same as that obtained by the cyclic pitch adjustment of the blades of a conventional helicopter rotor, and therefore the cyclic adjustment of each flap may be considered a cyclic pitch adjustment. The net effect of this cyclic adjustment of the three blades is equivalent to tilting the axis of rotor rotation, and consequently the thrust line of action, in a direction related to the direction of inclination of the ring member 48 and may be used to impart steering moments on the aircraft.

Movement of the ring member longitudinally of the drive shaft 22 adjusts the flaps 30, 30 collectively to change the basic camber of the blades, thereby enabling the selection of the most efficient blade shape for the particular flight conditions of the aircraft. For example, moving the ring member 48 forwardly, or in the upward direction as viewed in FIG. 2, moves all three rods 60, 60 forwardly to the same extent. This movement of the rods 60, 60 rotates the three bell cranks 62, 62 in such directions as to cause the three links 64, 64, and the three flap control rods connected therewith, to be drawn inwardly toward the center of the drive shaft. This in turn operates the three counterbalancing mechanisms 68, 68 to cause the three flaps 30, 30 to be deflected downwardly, to positions of increased blade camber, by equal amounts.

*Details of Hub Assembly*

Reference is now made to FIGS. 3 and 4 for a description of details of the hub assembly not covered in the foregoing general description. In FIGS. 3 and 4 the parts have been given the same reference numerals as applied to corresponding parts in FIG. 2, but in FIGS. 3 and 4 some of the parts appear differently from those shown in FIG. 2 due to the addition of details omitted from FIG. 2.

Considering first the manner in which the blades 14, 14 are connected with the hub members 18 and 20 and first referring to FIG. 3, it will be noted that the illustrated cross shaped pivot member 24 has two colinear arms 70 and 72 arranged with their common axis parallel to the drive shaft 22 and received respectively by the forward hub member 18 and the rear hub member 20. The arm 70 is supported for rotation relative to the hub member 18 by a roller bearing unit 74 and the lower arm 72 is supported for rotation relative to the hub member 20 by another roller bearing unit 76. Rotation of the pivot member 24 permitted by the bearing units 74 and 76 thus occurs about an axis parallel to the drive shaft 22 and results in lead-lag or in-plane motion of the associated blade. As shown in FIG. 3 the cross shaped pivot member 24 has a centrally located and radially extending opening formed therethrough which opening is fitted with a sleeve 78 for cooperation with other parts as hereinafter described to enable the transmission of flap control movements through the pivot member. Although FIG. 3 shows only the connecting means associated with one blade, it will be understood that the means associated with the other two blades are identical to the one illustrated.

The upper or outer arm 70 of the pivot member 24 illustrated in FIG. 3 extends outwardly beyond the hub member 18 and receives a radially inwardly extending arm 80. The arm 80 is splined or otherwise nonrotatively fixed to the pivot arm 70 and is held axially in place by a nut or other retaining means on the end of the arm 70. The arm 80 forms part of a lead-lag or in-plane motion restraining means for holding the associated blade in a generally normal or radial position during idle periods and for preventing resonant or natural frequency vibration of the blade during rotation. As shown in FIG. 4, each restraining means further includes a housing 82 fixed to the outer hub member 18. The inner end of the arm 80 extends into the housing 82 and is engaged on opposite sides by two pistons 84, 84 slidable within a generally transverse bore formed in the housing. Associated with each piston is a spring means which urges the piston towards the arm 80. The two spring means thus work in opposition so that the arm 80 is normally held in a centered position with respect to the housing, and movement of the arm in either direction from the centered position is resisted by one or another of the spring means. These spring means are designed with relatively high spring constants so that when the rotor-propeller is at rest the pistons will hold the associated blade in a generally normal or radial position against the force of gravity on the blade.

During rotation of the rotor-propeller the spring means associated with the pistons 84, 84 serve to eliminate the possibility of ground resonance due to a coupling between the in-plane motion of the blade about its lead-lag hinge and the motion of the helicopter on its landing gear. The spring means also serves to eliminate mechanical instability due to a similar coupling between the in-plane motion of the blade about its lead-lag hinge and the motion of the hub as determined by other structure of the aircraft. What the spring means does is to increase the rigidity and natural frequency of the blades in the in-plane direction. The springs are so designed that the natural frequency of the blade is made substantially higher than the maximum operating r.p.m. of the rotor. This eliminates natural frequency vibration of the blade in the in-plane direction and as a result prevents coupling between the blade motion and other motions to cause ground resonance or mechanical instability. The springs, however, do allow motion of the blade relative to the hub and therefore reduce the bending stresses which would be present in a blade rigidly fixed to the hub.

The spring means associated with the two pistons 84, 84 may take various different forms but in the preferred and illustrated case they consist of a plurality of Belleville washers 86, 86 axially stacked on each of the pistons as shown in FIG. 4. Each piston 84 includes a central stem 88 which receives the washers and at the end adjacent the arm 80 is provided with a head 90 which engages the arm and with a cylindrical skirt 92 which slidably engages the bore of the housing 82. The skirt 92 is radially spaced from the stem 88 to provide an annular opening which receives some of the washers 86, 86. At its outer end the stem 88 passes through a retaining nut 94. The retaining nut 94 is threadably received by the housing 82 and at its inner end engages the outermost one of the washers 86, 86 to control the amount of preload on the washers. In the illustrated case each piston head 90 includes a pad 96 of Teflon or the like for engaging the arm 80.

Referring to the lower left-hand portion of FIG. 4 it will be noted that each pivot member 24 further includes two transverse colinear arms 98, 98. At its inboard end the associated blade grip 26 is bifurcated and its two arms are pivotally mounted to the two arms 98, 98 of the pivot member 24 by two roller bearing units 100, 100. The central axis of the two arms 98, 98 about which the blade grip 26 moves is the flapping axis of the blade.

Attached to the inboard end or root of each blade body 28, as shown in FIG. 3, is a shank 102 which extends into the associated blade grip 26 and is rotatably supported thereby by two bearing units 104, 106. The bearings 104 and 106 define the longitudinal axis of the blade body 28 about which the body is rotated for the purpose of changing the pitch or incidence of the blade relative to its plane of rotation. As noted heretofore, the blade body is positioned about its pitch axis, that is the axis of the shank 102, by the arm 44 attached to the blade body and the associated linkage connected with the arm.

It will also be recalled that the longitudinal push-pull rod 66 extending through the blade body is used to control the position of the associated flap 30 and that the movement of the rod 66 is in turn controlled by the azimuth mechanism 46. Oscillating movements of the swash plate 56 of the azimuth mechanism are transmitted to each of the rods or links 64, 64 by the rods 60, 60 and bell cranks 62, 62 as previously described. As shown in FIGS. 3 and 4 the movement of the illustrated rod 64 is transmitted through the associated universal joint to the associated rod 66 by linkage which permits flapping and lead-lag motion of the blade without interfering with the control of the associated flap. Identical means are employed with each of the three blades and in each case includes two intermediate links 108 and 110 and a sliding member 112, the latter of which is received by and slides relative to the bore of the sleeve 78. The intermediate link 108 is relatively short in length and at its inner end is pivotally connected by a pin 113 with the associated rod 64 for movement about an axis generally parallel to the lead-lag axis. At its other end the link 108 is pivotally connected to a pin 114 which pin is carried by the slide 112 and arranged with its axis generally parallel to the flapping axis of the blade. The other intermediate link 110 is also pivotally connected with the pin 114 at its inner end and at its other end is pivotally connected with the flap control rod 66. Although the slide 112 and pin 114 move relatively to the sleeve 78, the axis of the pin is at all times sufficiently close to the flapping axis, considering the geometry of the system, that a negligible amount of extraneous movement is induced in the control rod 66 by the flapping of the blade. Thus, movement of the rods 108 and 110 about the axis of the pin 114 permits the blade to partake of flapping motions without disturbing the transmission of control movements to the rod 66. When in-plane motion of the blade occurs the link 108 moves relative to the rod 64 about the axis of the pin 113. Also the inner end of the rod 64 is connected to the bell crank by a ball-type joint to permit swiveling motion of these two members. The axis of the pin 113 is sufficiently close to the lead-lag axis of the pivot members 24, and the flapping movements of the blade sufficiently small, that a negligible amount of extraneous movement is induced in the control rod 66 by the lead-lag movement of the blade. Thus, movement of the rod 108 about the axis of the pin 113 permits in-plane motion of the blade without adversely effecting the transmission of control movements to the flap.

Referring to FIG. 3 for some other details of the hub assembly not mentioned in the general description, it will be noted that the ball member 58 of the azimuth mechanism 46 is provided with an annular groove 116 in its inner surface and that this groove receives a circumferential rib 118 formed on the outer surface of the drive shaft 22. The rib and groove serve to limit the longitudinal displacement of the ball member 58 and therefore control the maximum and minimum extents to which the camber of the blade may be adjusted by sliding the azimuth mechanism longitudinally of the drive shaft. Also included in the azimuth mechanism 46 is a torque scissors 120 associated with the ring member 48 and another torque scissors 122 associated with the swash plate 56 for removing torque loads from the control rods 50, 52 and 54 and the rods 60, 60.

Details of Blade Structure and Counterbalancing Mechanism

The construction of one of the blades of the rotor-propeller is shown in detail in FIGS. 5, 6, 7 and 8. As shown in FIG. 5 and as mentioned previously in connection with FIG. 1 the blade 14 comprises essentially a body 28 and a flap 30 located along the trailing edge of the body at the outer or tip portion of the blade. The flap 30 is pivotally connected to the body 28 for movement about a longitudinal axis by hinge connections at the inboard and outboard ends of the flap. As the blade rotates, centrifugal force on the flap 30 tends to move the same outwardly toward the tip of the blade.

In order to reduce centrifugal loading of the outboard flap hinge, the inboard hinge is of a special construction designed to transfer the centrifugal loads to the more sturdy root portions of the blade. Such a special hinge construction is shown in FIG. 6. From this figure it will be noted that the hinge includes a stud 124 which is fixed relative to the flap 30 and which passes through two crush blocks 126 and 128 and through two flap ribs 130 and 132, the crush blocks serving to distribute forces exerted by the stud on the flap evenly over the ribs 130 and 132 to prevent the latter from being crushed or otherwise damaged by the stud. The inboard end of the stud 124 extends into a spanwise or longitudinal opening 134 formed in the body 28 and is rotatably supported relative to the body by a swivel bearing unit 136. Inboard of the bearing unit the stud is fixed by a pin 138 to one end of a connector 140, and the other end of the connector is attached to an armored cable 142 which serves as a tension-torsion element. The cable 142, as shown in FIG. 5, extends through the opening 134 and at its inboard end is provided with a threaded connector having a nut 144 which bears against the root structure of the blade. When the flap 30 is deflected the cable 142 twists about its longitudinal axis to permit rotation of the stud 124 relative to the bearing 136. During rotation of the blade the centrifugal forces developed by the flap 30 are absorbed by the stud 124 and the cable 142 and transferred to the root structure of the blade by the nut 144 which bears against said latter structure, thereby relieving the outboard hinge from the centrifugal flap load. Referring to FIG. 6 it will be noted that in the illustrated case the opening 134 in the blade body is provided with plastic liners 146 and 148 to prevent the cable 142 and other structure of the hinge from abrading the body material.

In the illustrated blade the outboard flap hinge is indicated generally at 150 in FIGS. 5 and 7 and comprises a stud 152 carried by the flap 30 which stud includes an outwardly extending portion journalled in a bearing 154. The bearing 154 is carried by a separate tip structure 156 fastened to the blade body 28 as by bolts 158, 158. The tip structure 156 extends rearwardly or in a trailing direction from the outboard end of the blade body 28 and in effect defines with the inboard portion of the blade body a notch for receiving the flap 30.

FIGS. 7 and 8, and also FIG. 2, show the mechanism employed for transmitting the longitudinal movements of the push-pull rod 66 to the flap 30 for deflecting the flap relative to the blade body. In addition to fulfilling a mere motion transmitting function, however, this mechanism is also designed as a counterbalancing means for reducing or counteracting the centrifugal and aerodynamic loads which would otherwise be imposed on the control rod 66. From FIGS. 2 and 7 it will be noted that the rod 66 has a connector 160 fastened to its outboard end and that the connector is in turn pivotally connected at one point to one arm of a walking beam 162 and at another point is pivotally connected to the arm 164 of a bell crank 166. The walking beam 162 is supported intermediate its ends for rotation about a vertical transverse axis by a pivot pin or bolt 168. The bell crank 166 is likewise supported for movement about a vertical transverse axis by a pivot pin or bolt 170. The other arm of the walking beam 162 is pivotally connected with one end of a centrifugal counterweight 172. The counterweight 172 extends outwardly from the walking beam towards the tip structure 156 and includes a piloting stem 174 supported for sliding movement relative to the tip structure by a swivel bearing 176.

The other arm 178 of the bell crank 166 extends inwardly from the pivot pin 170 and is pivotally secured by a pin or bolt 180 to a link 182 connected with a horn 184 on the under surface of the flap 30 as shown in FIG. 8. The arm 178 of the bell crank is relatively massive and serves as a centrifugal counterbalance for opposing the aerodynamic loads on the flap 30 as explained hereinafter in connection with FIGS. 9, 10 and 11.

From the foregoing description it will be apparent that the counterweight 172 and walking beam 162 constitute a means for imposing a centrifugally derived force on the push-pull rod 66 which force opposes the self-induced centrifugal load on the rod. That is, the walking beam constitutes a pivoted balance arm having the push-pull rod 66 attached to one of its ends and the counterweight attached to its other end. When the blade is rotated the centrifugal forces applied to the balance arm or walking beam by the rod and counterweight tend to rotate the lever in opposite directions about its pivot axis so that one force counteracts or opposes the other. Thus the centrifugal force of the counterweight 172 reduces the force required to hold the rod 66 in any given longitudinal position.

FIGS. 9, 10 and 11 show the manner in which the bell crank arm 178 operates to reduce aerodynamic loading of the push-pull rod 66. As shown in FIG. 9, the arm 178 is so designed that when the flap 30 is in its neutral position, or position of zero deflection relative to the blade body, its center of gravity is located on a radial line passing through the axis 170 of the bell crank. Thus, when the blade is rotated the centrifugal force $F_1$ of the arm 178 will pass through the axis 170 and exert no turning moment on the bell crank. In the neutral position of the flap shown in FIG. 9 the flap imposes substantially no load on the bell crank through the link 182 and therefore the forces on the bell crank are substantially balanced so that no load is imposed on the control rod 66 through the connector 160.

When the flap 30 is deflected downwardly or positively, relative to the blade body 28 the aerodynamic forces acting on the flap tend to return the same to its neutral position and a force $F_2$ acting in the direction shown in FIG. 10 is imposed on the link 182. At the same time, however, the centre of gravity of the link 178 is moved away from the radial line passing through axis 170 so that the centrifugal force $F_1$ acts about the axis 170 by a moment arm $r$. The torque exerted on the bell crank by the force $F_1$ acts in the opposite direction to that exerted thereon by the aerodynamic force $F_2$. Thus the centrifugal force $F_1$ reduces the resultant force required to be exerted by the push-pull rod 66 to hold the bell crank in the position shown. It will also be apparent that as the aerodynamic force $F_2$ is increased by increasing the deflection of the flap 30 the torque imposed on the bell crank by the centrifugal force $F_1$ likewise increases due to an increase in the moment arm $r$. Therefore by properly designing the bell crank 178 the centrifugal force $F_1$ may be made to remove substantially all aerodynamic loads from the push-pull rod 66 for all positions of the flap.

FIG. 11 shows the bell crank 166 in the position corresponding to an upward or negative deflection of the flap 30. It will be noted that in this case the aerodynamic load $F_2$ acts in the opposite direction from FIG. 10. Likewise, however, the center of gravity of the arm 178 is displaced to the opposite side of the radial line passing through the axis 170 so that the torques imposed on the bell crank by the centrifugal force $F_1$ and the aerodynamic force $F_2$ again act in opposite directions about the axis 170 to reduce the load on the push-pull rod 66.

General Summary of Operation

Assuming that the rotor-propeller is installed in a tilt-wing aircraft similar to that shown in the before-mentioned patent application, its operation may be described in general as follows.

During normal forward flight as an airplane the rotor-propeller serves to provide forward propulsive thrust and acts substantially similar to a conventional airplane propeller. The normal control surfaces of the aircraft are operable in this flight regime to provide steering moments and the cyclic pitch control of the rotor-propeller is therefore not used. This means that the ring member 48 and swash plate 56 of the azimuth mechanism 46 are held in a position normal to the drive shaft 22 by suitable mechanism connected with the azimuth control rods 50, 52 and 54. Nevertheless, the blades of the rotor-propeller are subject to collective pitch changes similar to a conventional airplane propeller by suitable mechanism connected with the collective control rod 32. Movement of the control rod 32 in an outward direction causes an increase in the collective pitch of the blades by rotating the three blade bodies 28, 28 in the same direction and to the same extents about their pitch changing axes. Movement of the control rod in the opposite direction has the opposite effect of decreasing the collective pitch of the blades.

As the forward speed of the aircraft changes the efficiency of a fixed blade shape also changes. At a low forward speed a highly cambered blade shape is more efficient and produces more thrust than a less cambered blade. Such a highlhy cambered blade, however, is quite inefficient at high forward speeds. Therefore, as the speed of the aircraft changes the camber of the rotor-propeller blades may be changed to provide optimum blade efficiency for each speed by collectively changing the deflection of the rotor flaps 30, 30 relative to the blade bodies 28, 28. This is accomplished by suitable mechanism connected with the azimuth control rods 50, 52 and 54 which move the latter simultaneously and to the same extents to shift the azimuth mechanism 46 bodily along the axis of the shaft 22.

When the rotor-propeller is tilted upwardly relative to the aircraft fuselage it may be operated to produce a lifting force and steering moments in a manner similar to a helicopter rotor. In this flight regime the pitches of the blades may once again be changed collectively to vary the lifting force by the mechanism associated with the collective control rod 32, and the camber of the blades may be varied as explained above to obtain the optimum blade shape. In addition, however, the blade may also be adjusted in a cyclic manner to vary the thrust line of action for steering the aircraft. This is effected by suitable mechanism connected with the azimuth control rods 50, 52 and 54 which tilts the azimuth ring 48 in a direction related to the desired direction of the line of thrust. The result is a cyclic variation in the deflection of the flaps 30, 30 about their normal positions, as determined by the position of the azimuth mechanism on the shaft 22, with the flaps reaching a position of maximum deflection when at one point along the path of rotation and reaching a position of minimum deflection when at the diametrically opposite point in their path of rotation.

During the rotation of the blades 14, 14 the counterbalancing mechanism located in the tip of each blade serves to counteract the aerodynamic forces imposed on the flap 30 and the centrifugal forces imposed on the control linkage so that the forces required to be exerted by the azimuth control rods 50, 52 and 54 for the purpose of tilting the azimuth mechanism 46 are substantially reduced.

The invention claimed is:

1. An aircraft rotor-propeller comprising a hub adapted for rotation about a central axis, a plurality of blades connected with said hub for rotation therewith and each of which blades includes a first part adjustable relative to said hub to change its angle of incidence with respect to its plane of rotation and a second part adjustable relative to said first part to change its angle of incidence with respect to said first part while said first part remains in any selected position relative to said hub, means for selectively adjusting said second parts in a collective manner relative to said first parts, and means for selectively adjusting one set of said parts in a cyclical manner to change the direction of the thrust line of action with respect to said central axis.

2. An aircraft rotor-propeller comprising a hub adapted for rotation about a central axis, a plurality of blades connected with said hub for rotation therewith and each of which blades includes a first part adjustable relative to said hub to change its angle of incidence with respect to the plane of blade rotation and a second part adjustable relative to said first part to change its angle of incidence with respect to said first part while said first part remains in any selected position relative to said hub, means connected with the first parts of said blades for selectively adjusting said first parts in a collective manner, and means connected with said second parts of said blades which means are selectively operable to adjust said second parts relative to said first parts in a collective manner, in a cyclical manner, or in both a collective and a cyclical manner independently of the adjustment of said first parts.

3. An aircraft rotor-propeller comprising a hub adapted for rotation about a central axis, a plurality of blades connected with said hub for rotation therewith and each of which blades includes a generally radially extending blade body adjustable about a general radial pitch changing axis relative to said hub to change its angle of incidence with respect to the plane of blade rotation and a flap connected with said blade body and adjustable about a generally radial deflection changing axis relative to said blade body to change its deflection with respect to said blade body while said blade body remains in any selected position relative to said hub, means connected with said blade bodies for adjusting the same about their pitch changing axes in a collective manner, and means connected with said flaps for selectively adjusting the same about their deflection changing axes in a collective manner, in a cyclical manner, or in both a collective and a cyclical manner relaitve to said blade bodies and independently of the adjustment of said blade bodies about their pitch changing axes.

4. An aircraft rotor-propeller comprising a hub adapted for rotation about a central axis, a plurality of blades connected with said hub for rotation therewith and each of which blades includes a generally radially extending blade body adjustable about a generally radial pitch changing axis relative to said hub to change its angle of incidence with respect to the plane of rotation and a flap connected with said blade body and adjustable about a generally radial deflection changing axis relative to said blade body while said blade body remains in any selected position relative to said hub, said blade body and flap being so constructed and arranged that along the length of said flap said body and flap form a composite aerofoil blade shape with the movement of said flap about said deflection changing axis serving to vary the camber of said blade shape, means for adjusting said blade bodies in unison and to the same extents about said pitch changing axes to change the incidence of said blades in a collective manner, means for adjusting said flaps in unison and to the same extents about said deflection changing axes and relative to said blade bodies to change the camber of said blades in a collective manner, and means for adjusting said flaps about said deflection changing axes in a cyclical manner as said hub is rotated to change the direction of the line or thrust produced by said rotor-propeller.

5. An aircraft rotor-propeller comprising a hub adapted for rotation about a central axis, a plurality of blades, means connecting said blades to said hub for imparting the rotation of said hub to said blades and for permitting said blades to move in a flapping motion relative to said hub, said blades each including a first part adjustable relatively to said hub to change its angle of incidence with respect to its plane of rotation and a second part adjustable relative to said first part to change its angle of incidence with respect to said first part while said first part remains in any selected position relative to said hub, means for selectively adjusting said second parts in a collective manner relative to said first parts, and means for selectively adjusting one set of said parts in a cyclical manner to change the direction of the thrust line of action with respect to said central axis.

6. An aircraft rotor-propeller comprising a hub adapted for rotation about a central axis, a plurality of blades, means connecting said blades to said hub for imparting the rotation of said hub to said blades and for permitting said blades to move in a lead-lag motion relative to said hub, said blades each including a first part adjustable relatively to said hub to change its angle of incidence with respect to its plane of rotation and a second part adjustable relative to said first part to change its angle of incidence with respect to said first part while said first part remains in any selected position relative to said hub, means for selectively adjusting said second parts in a collective manner relative to said first parts, and means for selectively adjusting one set of said parts in a cyclical manner to change the direction of the thrust line of action with respect to said central axis.

7. An aircraft rotor-propeller as defined in claim 6 further characterized by a spring means connected between each of said blades and said hub for resisting the lead-lag motion of said blades relative to said hub and for increasing the natural frequency of blade vibration in the lead-lag direction.

8. An aircraft rotor-propeller comprising a hub adapted for rotation about a central axis, a plurality of blades, a plurality of universal joints each associated with a respective one of said blades for connecting said blades to said hub and for permitting said blades to move in both flapping and lead-lag motions relative thereto, said blades each including a first part adjustable relatively to said hub to change its angle of incidence with respect to its plane of rotation and a second part adjustable relative to said first part to change its angle of incidence with respect to said first part while said first part remains in any selected position relative to said hub, means for selectively adjusting said second parts in a collective manner relative to said first parts, and means for selectively adjusting one set of said parts in a cyclical manner to change the direction of the thrust line of action with respect to said central axis.

9. An aircraft rotor-propeller comprising a hub adapted for rotation about a central axis, a plurality of blades each of which includes an elongated blade body and a flap adjustably connected with said blade body for movement about a generally longitudinal deflection changing axis relative to said blade body to change its deflection with respect thereto while said blade body remains in any selected position relative to said hub, means for connecting each blade body to said hub so as to extend generally radially outwardly therefrom, said connection means being of a type which permits said blade body to be adjusted about a generally radial pitch changing axis relative to the hub to change its angle of incidence with respect to its plane of rotation and which also permits said blade body to partake of flapping motion relative to said hub, means connected with said blade bodies for adjusting the same in a collective manner relative to said hub about said pitch changing axes, and means connected with said flaps for selectively adjusting the same about said deflection changing axes relative to said blade bodies in collective manner, in a cyclical manner, or in both a collective and a cyclical manner relatively to said blade bodies and independently of the adjustment of said blade bodies about said pitch changing axes.

10. An aircraft rotor-propeller comprising a hub adapted for rotation about a central axis, a plurality of blades each of which includes an elongated blade body and a flap adjustably connected with said blade body for movement about a generally longitudinal deflection changing axis relative to said blade body to change its defleciton with respect thereto while said blade body remains in any selected position relative to said hub, means for connecting each blade body to said hub so as to extend generally radially outwardly therefrom, said connection means being of a type which permits said blade body to be adjusted about a generally radial pitch changing axis relative to the hub to change its angle of incidence with respect to its plane of rotation and which also permits said blade body to partake of lead-lag motion relative to said hub, means connected with said blade bodies for adjusting the same about said pitch changing axes in a collective manner relative to said hub, and means connected with said flaps for selectively adjusting the same about said deflection changing axes relative to said blade bodies in a collective manner, in a cyclical manner, or in both a collective and a cyclical manner relative to said blade bodies and independently of the adjustment of said blade bodies about said pitch changing axes.

11. An aircraft rotor-propeller as defined in claim 10 further characterized by spring means connected between each of said blades and said hub for resisting the lead-lag motion of said blades relative to said hub and for increasing the natural frequency of blade vibration in the lead-lag direction.

12. An aircraft rotor-propeller comprising a hub adapted for rotation about a central axis, a plurality of blades each of which includes an elongated blade body and a flap adjustably connected with said blade body for movement about a generally longitudinal deflection changing axis relative to said blade body to change its deflection with respect thereto while said blade body remains in any selected position relative to said hub, a plurality of universal joints each connecting a respective one of said blade bodies to said hub so that said blade bodies may move in both flapping and lead-lag motions relative to said hub and for permitting each blade body to be adjusted about a generally radial pitch changing axis relative to the hub to change its angle of incidence with respect to its plane of rotation, means connected with said blade bodies for adjusting the same in a collective manner relative to said hub about said pitch changing axes, and means connected with said flaps for selectively adjusting the same about said deflection changing axes relative to said blade bodies in a collective manner, in a cyclical manner, or in both a collective and a cyclical manner relative to said blade bodies and independently of the adjustment of said blade bodies about said pitch changing axes.

13. An aircraft rotor-propeller as defined in claim 12 further characterized by each of said universal joints including a cross-shaped pivot member having a first pair of colinear arms pivotally connected with said hub for movement about a lead-lag axis arranged generally parallel with said central axis and a second pair of colinear arms pivotally connected with the associated blade body for movement of said blade body about a flapping axis arranged generally transversely of said central axis.

14. An aircraft rotor-propeller as defined in claim 13 further characterized by a plurality of spring means each associated with a respective one of said cross-shaped pivot members for restraining movement of the associated pivot member about its lead-lag axis in either direction from a given centered position.

15. An aircraft rotor-propeller as defined in claim 13 further characterized by a plurality of lead-lag restraining means each associated with a respective one of said cross-shaped pivot members, each of said lead-lag restraining means comprising an arm fixed to one of said first pair of colinear arms of the associated cross-shaped pivot member and extending radially with respect to its lead-lag axis, and a pair of spring means located on opposite sides of said arm and working between said arm and said hub for urging said arm and said pivot member to a central position and for resisting movement in either direction from said centered position.

16. An aircraft rotor-propeller comprising a drive shaft adapted for rotation about its longitudinal axis, a hub fixed to said drive shaft, a plurality of blades connected with said hub for rotation therewith and each of which blades includes a generally radially extending blade body adjustable about a generally radial pitch changing axis relative to said hub to change its angle of incidence with respect to the plane of blade rotation and a flap connected with said blade body and adjustable about a generally radial deflection changing axis relative to said blade body to change its deflection with respect to said blade body while said blade body remains in any selected position relative to said hub, means connected with said blade bodies for adjusting the same in a collective manner about their pitch changing axes, and an azimuth mechanism carried by said drive shaft and connected with said flaps for adjusting the deflections of the latter relative to their associated blade bodies independently of the pitch adjustment of said blade bodies by said last mentioned means, said azimuth mechanism including a ring member and swash plate tiltable relative to said drive shaft to cause adjustment of the deflection of said flaps in a cyclical manner as said shaft rotates and movable longitudinally of said shaft to adjust the deflection of said flaps in a collective manner.

17. An aircraft rotor-propeller comprising a hollow drive shaft adapted for rotation about its longitudinal axis, a hub fixed to said drive shaft, a plurality of blades connected with said hub for rotation therewith and each of which blades includes a generally radially extending blade body adjustable about a generally radial pitch changing axis relative to said hub to change its angle of incidence with respect to the plane of blade rotation and a flap connected with said blade body and adjustable about a generally radial deflection changing axis relative to said blade body to change its deflection with respect to said blade body while said blade body remains in any selected position relative to said hub, a rod disposed within said hollow drive shaft and movable longitudinally with respect thereto, a plurality of rockers each associated with a respective one of said blades and pivotally supported intermediate its ends relative to said hub, each of said rockers having a link connected between one of its ends and said control rod and another link connected between the other of its ends and the associated blade body so that longitudinal movement of said control rod causes simultaneous and equal rocking movements of said rockers and simultaneous and equal adjustments of said blade bodies about their pitch changing axes, and means connected with said flaps for selectively adjusting the deflections of the same in a collective manner, in a cyclical manner, or in both a collective and a cyclical manner independently of the adjustment of said blade bodies.

18. An aircraft rotor-propeller comprising a hollow drive shaft adapted for rotation about its longitudinal axis, a hub fixed to said drive shaft, a plurality of blades connected with said hub for rotation therewith and each of which blades includes a generally radially extending blade body adjustable about a generally radial pitch changing axis relative to said hub to change its angle of incidence with respect to the plane of blade rotation and a flap connected with said blade body and adjustable about a generally radial deflection changing axis relative to said blade body to change its deflection with respect to said blade body while said blade body remains in any selected position relative to said hub, a rod disposed within said hollow drive shaft and movable longitudinally with respect thereto, a plurality of rockers each associated with a respective one of said blades and pivotally supported intermediate its ends relative to said hub, each of said rockers having a link connected between one of its ends and said control rod and another link connected between the other of its ends and the associated blade body so that longitudinal movement of said control rod causes simultaneous and equal rocking movements of said rockers and simultaneous and equal adjustments of said blade bodies about their pitch changing axes, and an azimuth mechanism carried by said drive shaft and connected with said flaps for adjusting the deflections of the latter relative to their associated blade bodies independently of the pitch adjustment of said blade bodies by said control rod, said azimuth mechanism including a ring member and swash plate tiltable relative to said drive shaft to cause adjustment of the deflection of said flaps in a cyclical manner as said shaft rotates and movable longitudinally of said shaft to adjust the deflection of said flaps in a collective manner.

19. An aircraft rotor-propeller comprising a hollow drive shaft adapted for rotation about its longitudinal axis, a hub fixed to said drive shaft, a plurality of blades, a plurality of universal joints each associated with a respective one of said blades for connecting said blades to said hub and for permitting said blades to move in both flapping and lead-lag motions relative thereto, said blades each including a generally radially extending blade body adjustable about a generally radial pitch changing axis relative to said hub to change its angle of incidence with respect to the plane of blade rotation and a flap connected with said blade body and adjustable about a generally radial deflection changing axis relative to said blade body to change its deflection with respect to said blade body while said blade body remains in any selected position relative to said hub, a rod disposed within said hollow drive shaft and movable longitudinally with respect thereto, a plurality of rockers each associated with a respective one of said blades and pivotally supported intermediate its ends relative to said hub, each of said rockers having a link connected between one of its ends and said control rod and another link connected between the other of its ends and the associated blade body so that longitudinal movement of said control rod causes simultaneous and equal rocking movements of said rockers and simultaneous and equal adjustments of said blade bodies about their pitch changing axes, and an azimuth mechanism carried by said drive shaft and connected with said flaps for adjusting the deflections of the latter relative to their associated blade bodies independently of the pitch adjustment of said blade bodies by said control rod, said azimuth mechanism including a ring member and swash plate tiltable relative to said drive shaft to cause adjustment of the deflection of said flaps in a cyclical manner as said shaft rotates and movable longitudinally of said shaft to adjust the deflection of said flaps in a collective manner.

20. An aircraft rotor-propeller as defined in claim 19 further characterized by each of said universal joints including a cross-shaped pivot member having a first pair of colinear arms pivotally connected with said hub for movement about a lead-lag axis arranged generally parallel with the longitudinal axis of said drive shaft and a second pair of colinear arms pivotally connected with the associated blade body for movement of said blade body about a flapping axis arranged generally transversely of said longitudinal axis of said drive shaft, each of said cross-shaped pivot members further including a central radially extending opening passing therethrough, a plurality of push-pull rods each extending longitudinally of a respective one of said blade bodies for controlling the deflection of the associated blade flap, and a plurality of linkage means each associated with a respective one of said pivot members and passing through the central opening thereof for transmitting movements from said azimuth mechanism to the associated push-pull rod.

21. An aircraft rotor-propeller as defined in claim 20 further characterized by said linkage means associated with each pivot member including a member slidable in said central opening of the pivot member, a link having one end pivotally secured to said slidable member for relative rotation about an axis generally parallel to the flaping axis of said pivot member and its other end pivotally connected with another part of said linkage for relative movement about an axis generally parallel to the lead-lag axis of said pivot member, and means connecting the associated push-pull rod to said slidable member for causing movements of said push-pull rod in response to sliding movements of said slidable member.

22. An aircraft rotor-propeller comprising a drive shaft adapted for rotation about its longitudinal axis, a hub fixed to said drive shaft, a plurality of blades connected with said hub for rotation therewith and each of which blades includes a generally radially extending blade body adjustable about a generally radial pitch changing axis relative to said hub to change its angle of incidence with respect to the plane of blade rotation and a flap connected with said blade body and adjustable about a generally radial deflection changing axis relative to said blade body to change its deflection with respect to said blade body while said blade body remains in any selected position relative to said hub, means connected with said blade bodies for adjusting the same about said pitch changing axes in a collective manner, a plurality of push-pull rods each extending longitudinally of a respective one of said blade bodies, an azimuth mechanism carried by said drive shaft and connected with said push-pull rods for adjusting the latter longitudinally relative to their associated blade bodies independently of the adjustment of said blade bodies about their pitch changing axes by said last mentioned means, said azimuth mechanism including a ring member and swash plate tiltable relative to said drive shaft to cause adjustment of said push-pull rods in a cyclical manner as said shaft rotates and movable longitudinally of said shaft to adjust said push-pull rods in a collective manner, and a plurality of counterbalancing mechanisms each carried by a respective one of said blades and connected to the associated push-pull rod, each of said counterbalancing mechanisms including means for transmitting the motion of the associated push-pull rod to the associated flap to control the deflection of the latter and for exerting forces on the push-pull rod for counteracting the self-induced centrifugal load on the push-pull rod and the aerodynamic load imposed on the push-pull rod by the flap.

23. For use in an aircraft rotary thrust producing device of the type including a plurality of generally radial blades attached to a hub for rotation therewith, the combination comprising an elongated blade body, a flap connected with said blade body for movement about a deflection changing axis relative to said body to change its deflection with respect to said blade body, a push-pull rod extending generally longitudinally of said blade body, and a mechanism carried by said blade body and connected with said push-pull rod, said mechanism including means for transmitting the motion of said push-pull rod to said flap to control the deflection of the latter and for exerting a centrifugally derived force on said push-pull rod which force opposes the self-induced centrifugal load on the latter rod and thereby reduces the resultant force necessary to hold said rod in a given position during rotation of said blade body.

24. For use in an aircraft rotary thrust producing device of the type including a plurality of generally radial blades attached to a hub for rotation therewith, the combination comprising an elongated blade body, a flap connected with said blade body for movement about a deflection changing axis relative to said body to change its deflection with respect to said blade body, a push-pull rod extending generally longitudinally of said blade body, and a mechanism carried by said blade body and connected with said push-pull rod, said mechanism including means for transmitting the motion of said push-pull rod to said flap to control the deflection of the latter and for exerting a centrifugally derived force on said push-pull rod which force opposes the aerodynamic load exerted on said latter rod by said flap and thereby reduces the resultant force necessary to hold said rod in a given position during rotation of said blade body.

25. For use in an aircraft rotary thrust producing device of the type including a plurality of generally radial blades attached to a hub for rotation therewith, the combination comprising an elongated blade body, a flap connected with said blade body for movement about a deflection changing axis relative to said body to change its deflection with respect to said blade body, a push-pull rod extending generally longitudinally of said blade body, and a mechanism carried by said blade body and connected with said pushpull rod, said mechanism including means for transmitting the motion of said pushpull rod to said flap to control the deflection of the latter and for exerting centrifugally derived forces on said pushpull rod which forces oppose both the self-induced centrifugal load on the pushpull rod and the aerodynamic load exerted by said flap on the push-pull rod and thereby reduce the resultant force necessary to hold said rod in a given position during rotation of said blade body.

26. For use in an aircraft rotary thrust producing device of the type including a plurality of generally radial blades attached to a hub for rotation therewith, the combination comprising an elongated blade body, a flap connected with said blade body for movement about a deflection changing axis relative to said body to change its deflection with respect to said blade body, a pushpull rod extending generally longitudinally of said blade body, and a mechanism carried by said blade body and connected with said push-pull rod for transmitting the motion of said push-pull rod to said flap to control the deflection of the latter, said mechanism including a balance arm pivotally supported intermediate its ends relative to said blade body and connected at one of its ends to said push-pull rod, and a centrifugal counterweight attached to the other end of said balance arm, said balance arm and counterweight being so arranged that the centrifugal load imposed on said counterweight during rotation of said blade body is transferred by said balance arm to said push-pull rod to oppose the self-induced centrifugal load imposed on said push-pull rod.

27. For use in an aircraft rotary thrust producing device of the type including a plurality of generally radial blades attached to a hub for rotation therewith, the combination comprising an elongated blade body, a flap connected with said blade body for movement about a deflection changing axis relative to said body to change its deflection with respect to said blade body, a push-pull rod extending generally longitudinally of said blade body, and a mechanism carried by said blade body and connected with said push-pull rod for transmitting the motion of said push-pull rod to said flap to control the deflection of the latter, said mechanism including a member supported for movement about a transverse axis relative to said blade body and having a center of gravity located at some distance from said axis, said member being connected with said push-pull rod for movement about said transverse axis in response to movement of said flap by said push-pull rod and being so arranged that its center of gravity is located approximately on a line passing through the axis of blade rotation and said transverse axis when said flap is in a position of zero deflection relative to said blade body and is located to one side or the other of said line when said flap is deflected to one side or the other respectively of said position of zero deflection so as to exert a centrifugally derived force on said push-pull rod which acts in opposition to the aerodynamic load imposed on said rod by said flap when the latter is deflected from said position of zero deflection.

28. For use in an aircraft rotary thrust producing device of the type including a plurality of generally radial blades attached to a hub for rotation therewith, the combination comprising an elongated blade body, a flap connected with said blade body for movement about a deflection changing axis relative to said body to change its deflection with respect to said blade body, a push-pull rod extending generally longitudinally of said blade body for controlling the deflection of said flap, a balance arm pivotally supported intermediate its ends relative to said blade body for movement about a transverse axis and connected at one of its ends to said push-pull rod, a centrifugal counterweight attached to the other end of said balance arm for imposing a centrifugally derived force on said push-pull rod in opposition to the self-induced centrifugal load thereon when said blade is rotated, a member supported for movement about a transverse axis relative to said blade body and having a center of gravity located at some distance from said latter axis, said member being connected with said push-pull rod for movement about said latter transverse axis in response to movement of said flap by said push-pull rod and being so arranged that its center of gravity is located approximately on a line passing through the axis of blade rotation and said latter transverse axis when said flap is in a position of zero deflection relative to said blade body and is located to one side or the other of said line when said flap is deflected to one side or the other respectively of said position of zero deflection so as to exert a centrifugally derived force on said push-pull rod which acts in opposition to the aerodynamic load imposed on said rod by said flap when the latter is deflected from said position of zero deflection.

References Cited in the file of this patent
UNITED STATES PATENTS

| | | |
|---|---|---|
| 1,427,015 | Pescara | Aug. 22, 1922 |
| 1,948,457 | Larsen | Feb. 20, 1934 |
| 2,030,578 | Flettner | Feb. 11, 1936 |
| 2,232,289 | Upson | Feb. 18, 1941 |
| 2,430,767 | Hirsch | Nov. 11, 1947 |
| 2,443,393 | Landgraf | June 15, 1948 |
| 2,512,461 | Jenny | June 20, 1950 |
| 2,581,773 | Stalker | Jan. 8, 1952 |
| 2,604,953 | Campbell | July 29, 1952 |
| 2,757,745 | Verhage et al. | Aug. 7, 1956 |
| 2,939,535 | Brye | June 7, 1960 |
| 2,978,039 | Focke | Apr. 4, 1961 |

FOREIGN PATENTS

| | | |
|---|---|---|
| 1,213,809 | France | Nov. 2, 1959 |
| 695,918 | Germany | Sept. 5, 1940 |
| 272,377 | Switzerland | Apr. 2, 1951 |